United States Patent [19] [11] 4,131,938

Milberger et al. [45] Dec. 26, 1978

[54] DIGITAL CHOPPER REGULATOR

[75] Inventors: Walter E. Milberger, Severna Park; Frederick J. Rowe, Millersville, both of Md.

[73] Assignee: Westinghouse Electric Corp., Pittsburgh, Pa.

[21] Appl. No.: 788,093

[22] Filed: Apr. 15, 1977

[51] Int. Cl.[2] ............ H02M 3/08

[52] U.S. Cl. ............ 363/101; 323/25; 363/68

[58] Field of Search ............ 363/43, 63, 65, 67, 363/68, 69, 70, 101; 323/25

[56] References Cited

U.S. PATENT DOCUMENTS

| | | | |
|---|---|---|---|
| 2,965,833 | 12/1960 | Jensen | 323/45 |
| 3,270,270 | 8/1966 | Yenisey | 363/101 |
| 3,419,788 | 12/1968 | May | 323/6 |
| 3,723,855 | 3/1973 | Shuleshko | 323/25 |
| 3,867,643 | 2/1975 | Baker et al. | 363/43 |
| 3,892,977 | 7/1975 | Bierly | 323/25 |
| 3,896,368 | 7/1975 | Rym | 323/8 |
| 4,013,936 | 3/1977 | Hesler et al. | 363/65 |

*Primary Examiner*—Gerald Goldberg
*Attorney, Agent, or Firm*—R. M. Trepp

[57] ABSTRACT

A voltage regulator for providing a predetermined output voltage from an unregulated voltage input is described where the output voltage is compared with a reference voltage to generate one or more control signals which in turn activate boost regulators which inject voltage onto the output. Each boost regulator utilizes a transformer for injecting the voltage onto the output and a bypass diode across the transformer to permit the input voltage less the diode voltage drop to appear at the output when the boost regulator is not activated.

12 Claims, 8 Drawing Figures

DIGITAL CHOPPER REGULATOR

BACKGROUND OF THE INVENTION

1. Field of the Invention

This invention relates to voltage regulators, and more particularly to switching/chopper regulators and to active filters.

2. Description of the Prior Art

In the prior art, voltage regulators have been described utilizing a chopper in combination with a transformer and rectifying circuitry to boost the voltage of a direct current voltage bus. One example of a voltage regulator which boosts the voltage of an unregulated input DC bus is shown in U.S. Pat. No. 2,965,833 issued on Dec. 20, 1960 to J. L. Jensen entitled "Semiconductor Voltage Regulator Apparatus". Jensen shows a chopper which is used to convert a DC voltage to an AC voltage which is coupled into the output by means of a transformer and a rectifying bridge to convert the AC voltage to a direct current voltage which boosts the input voltage resulting in a regulated output voltage.

Another system that uses an injection technique for regulating the voltage is described in U.S. Pat. No. 3,896,368 issued on July 22, 1975 to Christian Rym. In the patent to Rym, the DC voltage to be regulated is compared with a reference voltage to generate an error signal. The error signal is fed to an analog to digital converter which converts the error signal to a digital value where each bit of the digital word is used to control switching in or out solar cell panels having a predetermined supply current. The supply current in each module is sized to correspond to the bit it is associated with in the digital word. Course voltage adjustment is therefore provided by switching in modules providing a fixed DC current dependent upon the value of the digital word. As the error signal values vary, the value of a digital word will likewise vary and the current switched onto the voltage bus will likewise vary to minimize the difference between the voltage on the supply bus and the reference voltage. Fine adjustment of the voltage bus is accomplished by using smaller bits of the digital word from the analog to digital converter to switch in loads having corresponding binary weighting onto the voltage bus. The loads act as current sinks to draw current off the voltage bus and therefore reduce the voltage on the voltage bus to achieve fine adjustment. In summary, a number of current sources each having a binary weighting and a number of loads each having a binary weighting are made available to be switched in or out of the voltage bus depending upon the error signal and the digital word generated from the error signal.

Another voltage regulator exemplary of the prior art is shown in U.S. Pat. No. 3,419,788 issued on Dec. 31, 1968 to J. C. May. In May, a series of boost injecting transformers are aligned in series between the unregulated voltage and the power line to be regulated. Individual square wave inverters are used for each transformer. This particular regulator is oriented for regulating alternating current where each transformer injects voltage, the amplitude of the voltage is controlled by an adjustable DC power supply and the time of injection is adjusted to correspond with the phase of the alternating current. Each boost injector or transformer is turned on for a predetermined time with relation to the phase of the AC voltage of the line to be regulated such that the summation of all the boost injectors results in an approximated sine wave which is added to the AC voltage to result in an increase in amplitude of the AC voltage. The current from the unregulated terminal must pass through a winding of each boost transformer before reaching the regulated power bus. The control of each individual square wave inverter and transformer is provided by an oscillator and logic circuit. An alternate embodiment varies the phase of the approximated sine wave with respect to the AC voltage to be regulated. Each individual boost transformer provides positive polarity for half of the alternating current cycle and negative polarity for the other half. The boost transformers, therefore, operate at the same frequency as the AC voltage it is regulating.

Other methods to provide regulation of DC power supply lines include passive components such as capacitors and inductors to act as filters and to provide reserve energy to maintain the voltage on the DC buses in situations such as extreme power brownouts. Another prior art means of regulating voltage consists of a linear regulator placed in series with the line to be regulated and provides a constant output voltage by varying the voltage drop across the linear regulator. A linear regulator may consist of, for example a transistor having its collector connected to the unregulated voltage bus and its emitter connected to the regulated bus. A sense circuit provides an error signal which is coupled to the base of the transistor which determines the amount of current that passes through the transistor and the voltage drop across the transistor. Linear regulators absorb considerable power since they provide a voltage drop in series with the total current that is used by the power bus.

It is therefore desirable to provide a voltage regulator which will provide active filtering at high efficiency, and remove the need to use large storage elements to prevent the effects of line dropouts.

It is further desirable that the regulator pump frequency have an ample frequency range so that the pump frequency may be locked to a multiple of the PRF of a radar system to control the frequency spectrum of any radiation.

It is further desirable to maintain the output voltage constant under extreme power brownouts utilizing a high frequency voltage regulator.

SUMMARY OF THE INVENTION

In accordance with the present invention, a voltage regulator provides a predetermined voltage from a power line comprising an input terminal coupled to the power line, an output terminal, a voltage source, a reference voltage, a plurality of boost regulators each having a first and second terminal and connected in series between the input and output terminal, means for comparing the reference voltage with the voltage on the output terminal to generate a plurality of control signals, at least one of the control signals coupled to each boost regulator, each boost regulator coupled to the voltage source, each boost regulator including first means coupled to the voltage source and to the first and second terminals for coupling the voltage source between the input terminal and the output terminal in response to the control signal coupled to the boost regulator, and second means coupled to the first and second terminals for coupling the first terminal and the second terminal at times when the voltage of the second terminal is below a predetermined value with respect to the first terminal.

The present invention further provides a boost regulator for injecting a voltage onto a power line comprising an input terminal coupled to the power line, a control signal, a voltage source for providing a voltage in response to the control signal, an output terminal, first means coupled to the voltage source and to the input and output terminals for coupling the voltage between the input terminal and the output terminal, and second means coupled to the input and output terminals for coupling the input terminal to the output terminal at times when the voltage is below a predetermined value.

DESCRIPTION OF THE PREFERRED EMBODIMENTS

Figure 1:
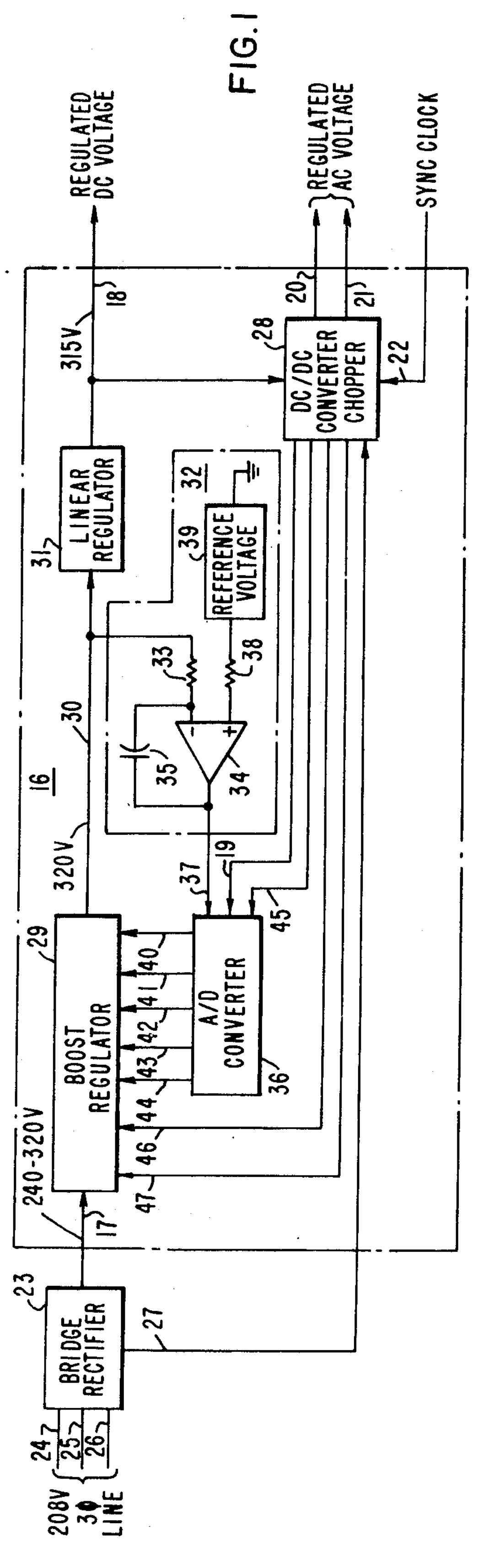
FIG. 1 shows a block diagram of one embodiment of the invention.

Referring to FIG. 1, a block diagram of voltage regulator 16 is shown. Voltage regulator 16 functions to accept unregulated DC voltage on input line 17 and to provide regulated DC voltage on output line 18 and regulated AC voltage on output lines 20 and 21. Voltage regulator 16 may, for example, accept unregulated DC voltage on input line 17 in the range from 240 to 320 volts and provide regulated DC voltage on output line 18 of 315 volts. The regulated AC voltage on output lines 20 and 21 may be adjusted by adjusting the turns ratio of a transformer to provide any desired AC voltage.

The unregulated DC voltage on input line 17 may, for example, be generated by bridge rectifier 23 which may accept 208 volts three-phase AC voltage on lines 24, 25 and 26. Bridge rectifier 23 may also include a small three-watt starter supply to provide DC voltage over line 27 to voltage regulator 16 to provide voltage for control circuitry such as a DC/DC converter chopper 28.

Input line 17 is coupled to boost regulator 29 which is comprised of a number of regulators not shown connected in series which add a predetermined amount of voltage to the input line 17 to provide an output on line 30. For example, input line 17 may have a ripple voltage of 18 volts peak to peak occurring at 2400 Hz. superimposed on a stable 300 volts DC. The output on line 30 may for example, have a DC voltage of 320 volts with a ripple voltage superimposed of 3 volts peak to peak, occurring at a frequency of 2400 Hz. The output on line 30 is coupled to an input of linear regulator 31 into an input of error generator 32. The output of linear regulator 31 is coupled to output line 18 into DC/DC converter chopper 28. Linear regulator 31 functions to provide additional voltage regulation over a small voltage range. The output voltage on line 18 may for example, be 315 volts and the ripple voltage may be attenuated by 80 dB with respect to the ripple voltage on input line 17. Th linear regulator 31 is not necessary for the operation of voltage regulator 16 but merely provides or shows that additional regulation by conventional means may be provided after boost regulator 29. For example, if boost regulator 29 has additional bits derived from the error signal and boosters corresponding to the bits, then the boost regulator may provide the regulation comparable to the level provided by linear regulator 31. As shown in FIG. 1, linear regulator 31 provides fine adjustment to the voltage whereas boost regulator 29 provides course adjustment to the voltage. The output line of boost regulator 29 provides a signal indicative of the voltage on line 30 to error generator 32 to which functions to generate an error signal which may be used to drive control signals to boost regulator 29.

One example of an embodiment of error generator 32 is shown in FIG. 1 wherein line 30 is coupled to one end of resistor 33 with the other end coupled to an input of amplifier 34 and to one side of capacitor 35. The other side of capacitor 35 is coupled to the output of amplifier 34 and to an input of A/D converter 36 over line 37. A second input of amplifier 34 is coupled through resistor 38 to an input of reference voltage 39. Reference voltage 39 functions to generate reference voltage upon which the output of boost regulator 29 is compared with. One example of a reference voltage 39 may be a battery. A second example of a reference voltage 39 may be a Zener diode and a current source for providing DC current through the Zener diode. As shown in FIG. 1, reference voltage 39 may be coupled to ground. Resistors 33 and 38 may for example, have a value of 50k ohms and amplifier 34 may be of the operational amplifier type such as LM108 manufactured by National Semiconductor Corporation, which exhibits low drift properties. Capacitor 35 may, for example, have a value of 0.3 microfarads. The values of the capacitor and resistors may be modified as is well known in the art to provide an optimum error signal having an appropriate frequency response.

The output of error generator 32 is coupled over line 37 to an input of A/D converter 36 wherein A/D converter 36 functions to convert the voltage on input line 37 to a digital representation which appears on output lines 40 through 44. Each output line 40 through 44 represents one bit in the digital representation of the voltage on line 37. The number bits required for the A/D converter 36 is dependent upon the number of bits which the boost regulator 29 may utilize. For example, in FIG. 1 a five-bit A/D converter 36 is shown. The more bits in the A/D converter allows a more precise representation of the error voltage 37 and enables a more accurate regulation of the output voltage on line 30 provided boost regulator 29 has provisions for utilizing all bits from the A/D converter. The digital representation for example, may be binary where the most significant bit would a zero or one and the next most significant bit would be zero or one representing one half the value of the most significant bit. If line 44 has the more significant bit then line 43 would represent one-half the value of the line 44 in the event it is a one. Line 42 would represent one-half of line 43 provided line 42 is a one. Line 41 would represent one-half of line 42 provided it is a one, and line 40 would represent one-half of line 41 provided it is a one, and in the case it is zero, then it represents no value or zero value. The output of A/D converter 36 therefore represents a plurality of control signals wherein each signal represents a specific magnitude of correction in response to the error voltage on line 37. A clock signal from DC/DC converter chopper 28 is coupled over line 45 to an input of A/D converter 36 and functions to provide a timing signal for converting the voltage on line 37 to a digital word. A second clock signal is coupled over line 19 and functions to determine when the digital word is represented on lines 40 through 44.

DC/DC converter chopper 28 is coupled over lines 46 and 47 to boost regulator 29, and functions to provide a voltage source to boost regulator 29. The voltage source, may for example, be a high frequency AC voltage in the frequency range from 50 to 100 kilohertz. Line 22 to DC/DC converter chopper 28 provides a synchronizing clock signal. Line 27 to DC/DC converter chopper 28 provides a startup voltage for the control circuitry. Line 18 to DC/DC converter chopper 28 provides power for the voltage source output on lines 46 and 47 and provides power for the regulated AC voltage on output lines 20 and 21.

Figure 2:
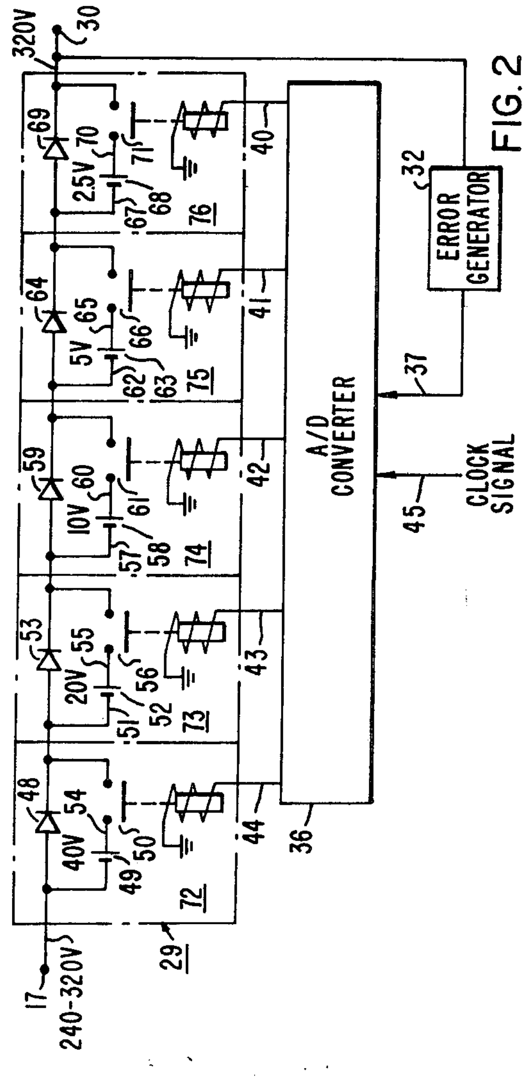
FIG. 2 shows one embodiment of the boost regulator bit used to form the boost regulator shown in FIG. 1.

One embodiment of boost regulator 29 of FIG. 2 is shown. Input line 17 is coupled to the anode of diode 48 and to one side of battery 49. The other side of battery 49 is coupled over line 54 to one side of switch 50. The control input of switch 50 is coupled to line 44 and the other side of switch 50 is coupled over line 51 to one side of battery 52, the cathode of diode 48 and the anode of diode 53. The other side of battery 52 is coupled over line 55 to one side of switch 56 having a control input coupled to line 43. The other side of switch 56 is coupled over line 57 to one side of battery 58, the cathode of diode 53 and to the anode of diode 59. The other side of battery 58 is coupled over line 60 to one side of switch 61. The control input of switch 61 is coupled to line 42. The other side of switch 61 is coupled over line 62 to one side of battery 63, the cathode of diode 59 and the anode of diode 64. The other side of battery 63 is coupled over line 65 to one side of switch 66. The control input of switch 66 is coupled to line 41. The other side of switch 66 is coupled over line 67 to one side of battery 68, the cathode of diode 64 and to the anode of diode 69. The other side of battery 68 is coupled over line 70 to one side of switch 71. The control of switch 71 is coupled to line 40. The other side of switch 71 is coupled over line 30 to the cathode of diode 69 and to terminal 72 which functions as the output terminal for boost regulator 29. Terminal 72 is also coupled over line 30 to an input of error generator 32 having an output on line 37 which is coupled to an input of A/D converter 36. A clock signal over line 45 is coupled to A/D converter 36 which has output lines 40 through 44 which represent the digital value of the voltage on line 37 or generate control signals on lines 40 through 44 in response to the voltage on line 37.

In the embodiment shown in FIG. 2 of boost regulator 29, a DC/DC converter chopper 28, as shown in FIG. 1, is not needed since the batteries 49, 52, 58, 63 and 68 are included in the boost regulator 29 and provide a voltage source for each bit regulator. The input voltage on line 17 may, for example, be unregulated DC voltage such as from a bridge rectifier having voltage in the range of from 240 to 320 volts DC. The output voltage on line and terminal 30 may be, for example, a regulated 320 DC. In FIG. 2, like references are used for functions corresponding to the apparatus of FIG. 1.

Error generator 32 compares the voltage on line 30 with a reference voltage internal to error generator 32 and generates an error voltage on line 37 to A/D converter 36 which converts the error voltage to a digital word or to a plurality of control signals as shown by lines 40 through 44. A clock signal on line 45 determines the frequency upon which A/D converter 36 responds to error voltage on line 37 and generates new control signals on lines 40 through 44. Voltage source 49 or battery 49 may, for example, be 40 volts which may be switched in line between lines 17 and 30 by means of switch 50 in response to a signal on control line 44. When switch 50 is closed, 40 volts is placed in series between the voltage on line 17 and the voltage on line 30 thereby boosting the voltage on line 30 with respect to line 17 by 40 volts. Diode 48, battery 49, switch 50, and control line 44 constitute boost regulator 72 for injecting a voltage onto the power line. Boost regulator 29 comprises a plurality of boost regulators connected in series to provide regulation over a number of voltage steps. Voltage source or battery 52 may be coupled in line between line 17 and line 30 by means of switch 56 which is controlled by line 43. When switch 56 is closed, 20 volts is placed in line between line 17 and line 30 and raises the voltage at line 30 by 20 volts with respect to the voltage on line 51. Battery 52, diode 53, and switch 56 comprise boost regulator 73 for injecting a voltage onto the power line under the control of line 43. Battery 58, switch 61, and diode 59 constitute a boost regulator 74 under the control of line 42. Battery 63, switch 66, and diode 64 comprise a boost regulator 75 for injecting voltage onto a power line under the control of line 41. Battery 68, switch 71, and diode 69 constitute a boost regulator 76 under the control of line 40. Pass diodes 48, 53, 59, 64 and 69 provide a DC path when any of the boost regulators or bit switches such as switches 50, 56, 61, 66, and 71 are open. When any switch of a boost regulator is closed, the diode in the boost regulator is back biased and the DC path is directed or flows through the battery or voltage source of the boost regulator thus providing a voltage boost. In FIG. 2 the voltage sources for each boost regulator 72 through 76 are arranged on a binary scale such as 40 volts, 20 volts, 10 volts, 5 volts, and 2.5 volts so that by operating the switches of the five boost regulators coupled in series to form boost regulator 29, the voltage may be boosted with respect to the voltage on line 17 from zero to 77.5 volts and 2.5 volts steps.

Since batteries have a voltage source are not practical in most applications, a chopper driven gated rectifier is used in place of the battery which may accept an alternating current voltage source to supply the power.

Figure 3:
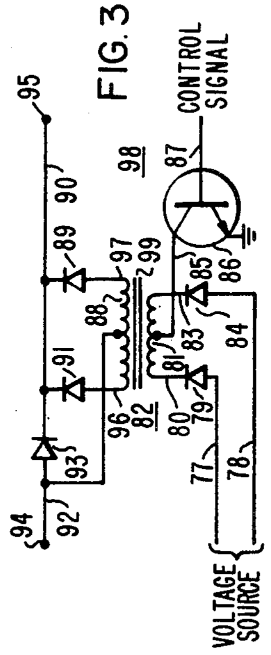
FIG. 3 shows a second embodiment of the boost regulator bit used to form the boost regulator shown in FIG. 1.

FIG. 3 shows an embodiment of a boost regulator which incorporates a gated rectifier for use with an AC voltage source. As shown in FIG. 3 an AC voltage source is coupled to line 77 and 78. Line 77 is coupled to the anode of diode 79 with the cathode of diode 79 coupled over line 80 to one side of winding 81 of transformer 82. The other side of winding 81 is coupled over line 83 to the cathode of diode 84 with its anode coupled to line 78. Winding 81 has a center tap which is coupled over line 85 to the collector of transistor 86 having its emitter coupled to ground. The base of transistor 86 is coupled to line 87. Transistor 86 functions as a switch to cause a low conductance path between line 85 and ground which is controlled by the voltage on line 87. As shown in FIG. 3, transistor 86 is an NPN transistor. Transformer 82 has a magnetic core made of ferrite material in the shape of a toroid. The second winding of transformer 82, winding 88, has one side coupled to the anode of diode 89 with a cathode coupled to line 90. The other side of winding 88 is coupled to the anode of diode 91 with its cathode coupled to line 90. Winding 88 has a center tap coupled to line 92. Line 92 is coupled to the anode of diode 93 with its cathode coupled to line 90. Line 92 is coupled to input terminal 94 and line 90 is coupled to output terminal 95. The input terminal may be coupled to a power line which may have ripple voltage upon it and be unregulated DC voltage. Input terminal 94 may be coupled to the output terminal of another voltage regulator of the kind shown in FIG. 3. The output terminal 95 may be coupled to the input terminal of another voltage regulator of the type shown in FIG. 2, or it may be coupled to or provide the voltage for a regulated DC voltage bus.

The boost regulator or voltage regulator shown in FIG. 3 may inject a voltage onto the input voltage on terminal 94 which would be available on the output terminal 95. The voltage is injected between terminals 94 and 95. Diodes 79, 84, 91, 89 and transformer 82 function to couple the voltage source on lines 77 and 78 between the input terminal 94 and the output terminal 95. When the control signal on line 87 goes high such as one volt, transistor 86 will saturate, causing the voltage on lines 77 and 78 to appear across winding 81 with the center tap of winding 81 coupled to ground through transistor 86. When the voltage on line 78 to positive, the current will conduct through diode 84 through a portion of winding 81 to line 85 through transistor 86 to ground. When the voltage on line 78 is negative, diode 84 will be back biased and no current will flow. When the voltage on line 77 is positive, diode 79 will conduct current on line 80 through winding 81 to its center tap and then through transistor 86 to ground. When the voltage on line 77 is negative, diode 79 will be back biased and no current will flow. Therefore, when transistor 86 is saturated or conducting due to the voltage on control line 87, the potential of line 85 will be approximately 0.3 volts. Current will alternately flow through diodes 79 and 84 through winding 81 to its center tap causing a voltage and current flow in winding 88. When transistor 86 is nonconducting, the voltage on line 85 will be dependent upon the voltage across winding 81. No current will flow through winding 81, however, since depending upon the polarity of the voltage across 81, due to the voltage on lines 77 and 78, either diodes 79 or 84 will be back biased or nonconducting.

The voltage across winding 81 will be coupled across transformer 82 to winding 88. If the voltage is positive, on the left side of winding 88, it will be coupled across diode 91 to line 90. The other end of the winding will be negative resulting in diode 89 being back biased. The center tap to winding 88 however, will be coupled to line 92, therefore causing the injected voltage on line 90 to be relative to the center tap voltage of winding 88. Likewise if the right side of winding 88 is positive and the left side is negative, diode 89 will be conducting and diode 91 will be reverse biased. The voltage will be coupled to line 90 through diode 89 and the injected voltage will be the voltage across line 90 to the center tap of winding 88 which is coupled to line 92. The center tap configuration of winding 88 coupled with diodes 91 and 89 rectify the AC voltage across winding 88 to provide a direct current voltage injected between terminal 95 and terminal 94. Diode 93 functions to couple terminal 94 to terminal 95 at times when the voltage on terminal 95 is below the voltage of terminal 94 minus the voltage across diode 93. Diode 93 acts as a pass diode when the voltage on terminal 95 is below terminal 94 minus the diode voltage drop and when boost regulator 98 is not injecting voltage. Without diode 93, DC current would flow from terminal 94 to the center tap of winding 88 whereupon it would divide and flow through either line 96 and diode 91 to line 90 or line 97 and diode 89 to line 90. Due to imbalance of the diode impedance of diodes 91 and 89, the DC current does not divide evenly between diodes 91 and 89 or is unbalanced causing the transformer core 99 of transformer 82 to go into saturation which is undesirable. One example of transformer core material is material 3C5 manufactured in the form of a toroid manufactured by Ferrox-Cube Corporation, Inc., Saugerties, N.Y. For a typical operation of the transformer over temperatures as high as 125° C., the magnetic flux is limited to about 1500 gauss per square centimeter. The magnetic flux may be adjusted by adjusting the number of turns of windings 81. The inclusion of diode 93 also helps to prevent or bypass current which otherwise flows through diodes 91 and 89 which would increase the storage time of diodes 89 and 91 causing them to turn off slower in response to a negative voltage at either end of winding 88. A slow turn-off of diodes 89 or 91 would result in come current being drained off line 90 which would lower the benefits or efficiency of boost injection of voltage especially when the frequency of the alternating voltage source on lines 77 and 78 are in the range of 50 kilohertz to 100 kilohertz. One example of a suitable diode for diode 93 is a Shottkey-pass diode having a forward voltage drop of 0.3 volts, a reverse breakdown voltage of 40 volts, and some tolerable amount of reverse leakage. A second example of a diode suitable for diode 93 is type MR 824 which is a high speed silicon switching diode manufactured by Motorola, Inc., Chicago, Ill.

In some applications, it may be desirable to control the voltage source on lines 77 and 78 at boost regulator 98 to determine the amount of boost injection voltage injected by boost regulator 98. The voltage source voltage may be controlled by operating transistor 86 in a linear mode and controlling the signal on line 87 to provide a voltage drop between the collector and emitter or from line 85 to ground across transistor 86. In this manner, the potential of 85 will be above ground and the voltage appearing across winding 81 to the center tap 85 will be the difference of the voltage on lines 77 and 78 and the voltage on line 85. Other circuitry which is conventional in the art, may be substituted in place of transistor 86 to provide a linear voltage drop across ground to line 85 in response to a control signal on line 87.

Figure 4:
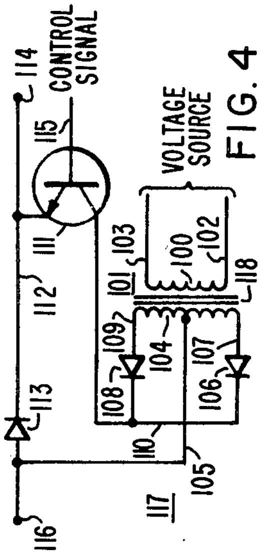
FIG. 4 shows a third embodiment of the boost regulator bit used to form the boost regulator shown in FIG. 1.

Referring to FIG. 4, a voltage source is coupled across winding 100 of transformer 101 by means of lines 102 and 103. The voltage appearing across winding 100 is coupled to winding 104 of transformer 101 having a center tap coupled to line 105. The ends of winding 104 are coupled to the anode of diode 106 over line 107 and the anode of diode 108 over line 109 respectively. The cathodes of diodes 106 and 108 are coupled over line 110 to the collector of transistor 111. The emitter of transistor 111 is coupled over line 112 to the cathode of diode 113 and to the output terminal 114. The base of transistor 111 is coupled over line 115 to a control signal which functions to control the voltage drop across the collector to emitter of transistor 111. Transistor 111 may operate in the saturated mode or in the nonsaturated mode. Of course, in the saturated mode the voltage drop across the collector to emitter will be approximately 0.3 volts. Line 105 is coupled to the input terminal 116.

In operation, the voltage across winding 100 is coupled to winding 104 as determined by the turns ratios between the two windings. One side or the other will be positive with respect to the center tap or line 105 and the other side will be negative. The positive side for example line 107, will cause current to conduct to diode 106 and through transistor 111 to terminal 114. The other side 109 will be negative and diode 108 will be reverse biased. If line 109 is positive with respect to the center tap or line 105 then current will conduct through diode 108 and through transistor 111 to terminal 114. Line 107 will be negative and diode 106 will be reverse biased. Terminal 114 will be biased positive with respect to terminal 116 and diode 113 will be reverse biased. When terminal 114 is at a potential below terminal 116 minus the voltage across diode 113, then diode 113 will conduct current from terminal 116 to terminal 114. Diode 113 acts as a pass diode to shunt the current to terminal 114 without passing through transformer 101 and diodes 106 and 108. Diode 113 functions for boost regulator 117 in FIG. 4 as diode 93 functions in boost regulator 98. Namely, diode 113 prevents current from flowing through diodes 106 and 108 which due to the imbalance of diode impedance, the DC currents through the diodes may be unbalanced, causing the core 119 of transformer 101 to go into saturation. In addition, excessive currents through diodes 106 and 108 will increase the storage time of the diodes resulting in a slow turn-off time. The injected voltage between terminals 116 and 114 may be adjusted by the voltage across transistor 111. When more voltage occurs across transistor 111, then less voltage will be injected across terminals 116 and 114 by boost regulator 117. Transistor 111 provides a means for adjusting the voltage injected across terminals 114 and 116 instead of adjusting the voltage source on lines 102 and 103.

Figure 5:
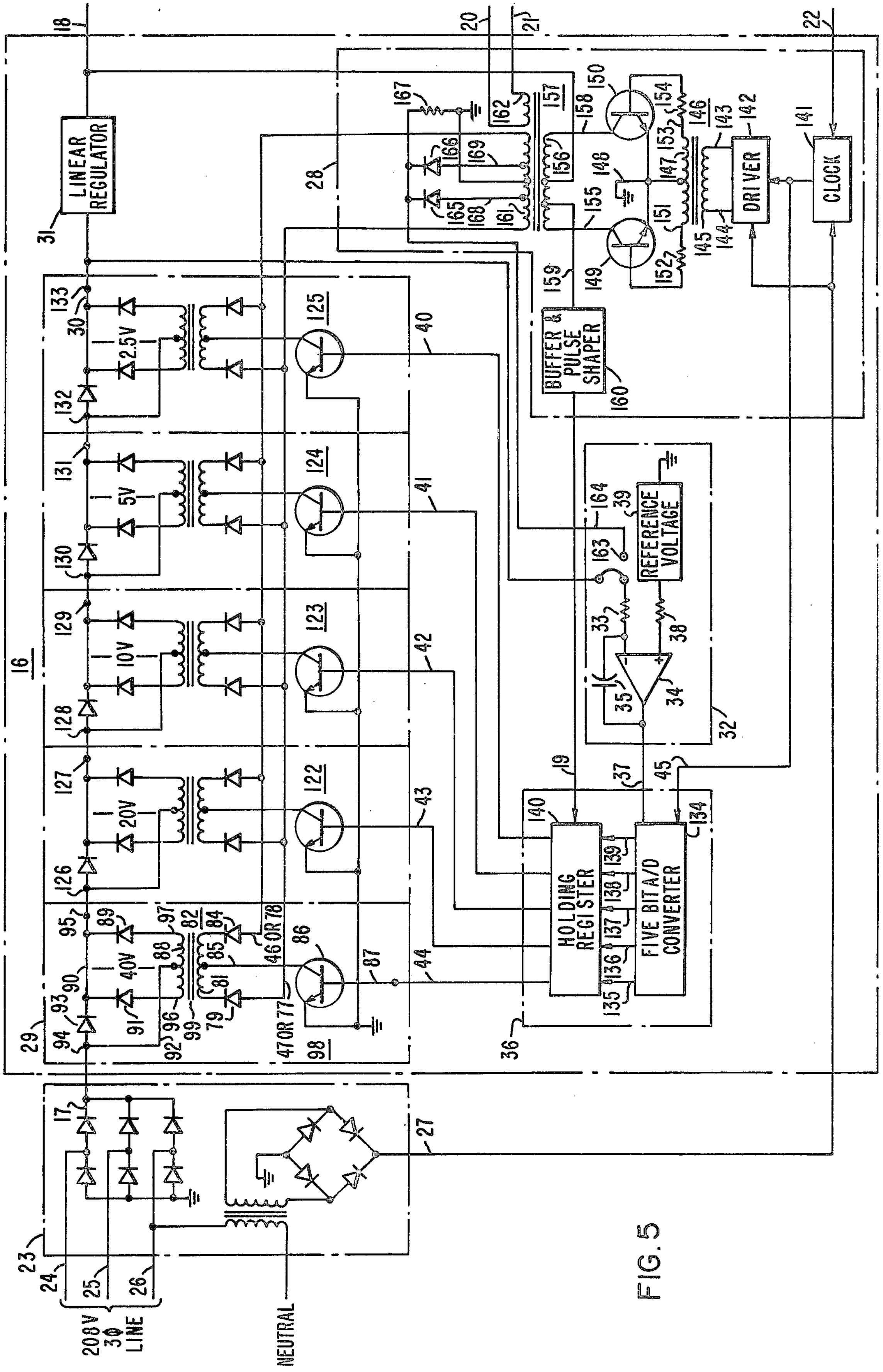
FIG. 5 shows one example of the circuitry to implement FIG. 1 using the boost regulator bit shown in FIG. 3.

FIG. 5 shows one example of circuitry to implement FIG. 1 using a number of boost regulators shown in FIG. 3. As shown in FIG. 5, a plurality of boost regulators 98, 122, 123, 124 and 125 are connected in series between input line 17 and output line 30. In FIG. 5, like references are used for functions corresponding to the apparatus of FIG. 1. In addition, boost regulator 98 as shown in FIG. 5 has like references used for functions corresponding to the regulator in FIG. 3. In FIG. 5, boost regulator 98 may for example, in response to a control signal in line 44 boost the voltage between its input terminal 94 and output terminal 95 by 40 volts. Boost regulators 122, 123, 124, and 125 are identical in circuitry as boost regulator 98 and functions in the same manner as boost regulator 98 except that the transformer winding ratios are adjusted such that the voltage injected between the input and output terminals are different. Boost regulator 122 for example, may inject 20 volts between its input terminal 126 and its output terminal 127. Boost regulator 123 may for example, inject 10 volts between its input terminal 128 and its output terminal 129. Boost regulator 124 may for example inject 5 volts between its input terminal 130 and its output terminal 131. Boost regulator 125 may for example inject 2.5 volts between its input terminal 132 and its output terminal 133. Boost regulators 98, 122, 123, 124 and 125 comprise boost regulator 29 as shown in FIG. 5 and FIG. 1. As shown in FIG. 5, A/D converter includes a five-bit A/D converter 134 which has an input coupled over line 37 to error generator 32 and output lines 135 through 139 coupled to holding register 140. Holding register 140 has a clock signal over line 19 from DC/DC converter chopper 28 to set in the new new control signals into holding register 140 when the voltage source on lines 46 and 47 from DC/DC converter chopper 28 is zero. Control signals 40 through 44 from holding register 140 activate the appropriate boost regulators so that a voltage is injected between input line 17 and output line 30 having a value to compensate for the difference between the voltage on line 30 or derived from the voltage on line 30 and the reference voltage 39.

The voltage on line 30 and reference voltage 39 is compared by amplifier 34 in error generator 32 to generate an error voltage on line 37 which is coupled to an input of five-bit A/D converter 134. The A/D converter 134 converts the voltage on line 37 in response to a clock signal on line 45 to generate a digital word or plurality of control signals on lines 135 through 139. Holding register 140 holds the previous values of the control signals until it is at a proper time to store the new values on lines 135 through 139 into holding register 140 which is determined by a signal on line 19. Control signals 40 through 44 therefore are derived in response to an error signal on line 37.

Each boost regulator 98, 122, 123, 124, and 125 is coupled to a voltage source such as lines 46 and 47 which in this case provides a common voltage source or pump from DC/DC converter chopper 28. Chopper 28 receives voltage on line 27 to power control circuits to initiate the startup of DC/DC converter chopper 28. A sync clock on line 22 to chopper 28 provides a reference frequency such as the pulse repetition frequency of a radar to enable the frequencies within chopper 28 to be at predetermined multiples of the sync clock. Thus, if chopper 28 radiates any energy or if some energy is coupled from chopper 28, the spectrum of this energy can be predetermined or controlled to prevent interference such as in a radar receiver. Line 22 is coupled to clock 141 which functions to generate a clock signal which is at a multiple of the input signal on line 22. Also in the event that there is no signal on line 22, clock 141 will generate a suitable frequency for operation of DC/DC converter chopper 28. The output of clock 141 is coupled over line 45 to A/D converter 36 and to an input of driver 142. Driver 142 functions to amplify the clock signal to provide power over lines 143 and 144 to winding 145 of transformer 146. The voltage across winding 145 is coupled to winding 147 having a center tap coupled over line 148 to ground and to the emitter of transistors 149 and 150 and of winding 147 as coupled over line 151 to resistor 152 to the base of transistor 149. The other end of winding 147 is coupled over line 153 through resistor 154 to the base of transistor 150. The collector of transistor 149 is coupled over line 155 to one end of winding 156 of transformer 157. The collector of transistor 150 is coupled over line 158 to the other end of winding 156. Winding 156 has a center tap which is coupled over line 18 to a DC power source, such as the input or output of boost regulator 29 or at the output of linear regulator 31 after boost regulator 29 as shown in FIG. 5. Linear regulator 31 is not necessary for the proper operation of the embodiment shown in FIG. 5 but is inserted merely to show that additional regulator may be provided in a conventional manner to provide voltage regulation over a very small voltage range. Winding 156 has a second tap coupled over line 159 to an input of buffer and pulse shaper 160. Buffer and pulse shaper 160 functions to provide a signal indicative of when the output voltage on lines 46 and 47 are zero or at a predetermined voltage or phase to permit the output on line 19 to be used as a strobing pulse for holding register 140. Winding 161 of transformer 157 has a voltage relative to the voltage across winding 156 depending upon the turns ratio. The center tap of winding 161 is coupled to ground and one end of winding 161 is coupled to line 47 and the other end is coupled to line 46 to provide a voltage source to boost regulator 29. Winding 162 has a voltage relative to the voltage across winding 156 depending upon the turns ratio of the two windings. One side of winding 162 is coupled to line 20 and the other side is coupled to line 21. Winding 162 provides a regulated AC voltage on lines 20 and 21 from the operation of chopper 28.

In the operation of chopper 28, clock 141 generates a frequency which may be a multiple of the signal frequency on line 22 and provides a clock pulse to driver 142 which amplifies the clock pulse and couples the energy into transformer 146. Winding 147 of transformer 146 has one side positive and the other side negative. The positive side supplies current such as line 151 through resistor 152 to transistor 149 which will cause transistor 149 to go into saturation. The base of transistor 150 will be negative and turned off. With transistor 149 conducting, line 155 and one side of winding 156 of transformer 157 is coupled to ground potential. The center tap of winding 156 is coupled to line 18. In an alternate embodiment the center tap of winding 156 may be coupled to line 30. The voltage across winding 156 from the center tap to line 155 causes a voltage to be induced in winding 161 which is dependent upon the turns ratio of windings 156 and 161. During the second half of the clock frequency from clock 141, the polarity of the voltage across winding 145 will be reversed and the voltage on line 153 will be positive and the voltage on line 151 will be negative. Current will flow through resistor 153 into the base of transistor 150 fto cause transistor 150 to be conducting which will couple line 158 and one side of winding 156 to ground. The base of transistor 149 will be negative and transistor 149 will be non-conducting. The voltage across winding 156 from its center tap to line 158 will cause a voltage to appear on winding 161 which is dependent upon the turns ratio of windings 156 and 161. The polarity of the voltage across winding 161 will be opposite during the second half of the clock frequency relative to the first half. The voltage across winding 156 will also cause a voltage to appear across winding 162 which will have one polarity during the first half of the clock cycle and an opposite polarity during the second half of the clock cycle from clock 141. Winding 161 functions as a voltage source which may be bused in common on lines 46 and 47 to all boost regulators. Winding 162 provides a regulated AC voltage on lines 20 and 21. It is understood that the voltage from line 18 across winding 156 will determine the voltage on windings 161 and 162. Therefore, if the DC voltage on line 18 is stable or regulated, then the voltage on windings 161 and 162 will likewise be stable or regulated. The circuitry and arrangement of chopper 28 permits a clock frequency out of clock 141 to be in the range from 50 kilohertz to 100 kilohertz.

An alternate embodiment for voltage regulator 16 may be made by sensing voltages at places in the voltage regulator 16 other than at the output of boost regulator 29. For example instead of resistor 33 being coupled to line 30, resistor 33 of error generator 32 may be coupled to line 17. In another embodiment, resistor 33 may be coupled to terminal 163. Terminal 163 is coupled over line 164 to the cathode of diodes 165 and 166 and to one side of resistor 167. The other side of resistor 167 is coupled to ground. The anode of diode 165 is coupled over line 168 to a tap on one side of the center tap of winding 161. The anode of diode 166 is coupled over line 169 to a tap on the other side of the center tap of winding 161. The AC voltage appearing across winding 161 is rectified by diode 165 and 166. The voltage on line 164 and terminal 163 is indicative of the voltage across winding 161 and the voltage of line 18. Resistor 167 provides a discharge path for the current passing through diodes 165 and 166.

Line 18 may have some additional filtering such as a series inductor to provide a filtered output and a filter capacitor coupled between the output and ground. The inductor and capacitor function to match the output to a particular load (not shown).

Figure 6:
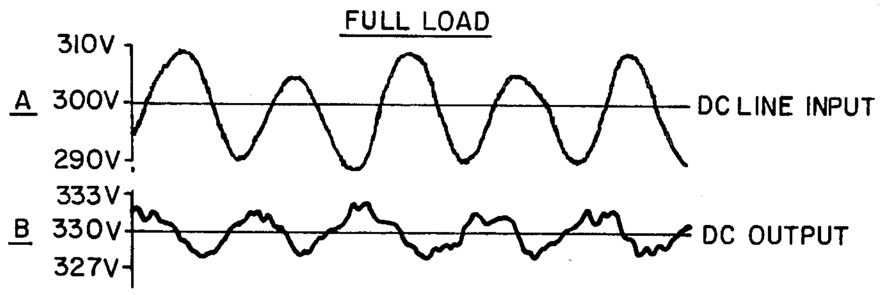
FIG. 6 shows curves for the input and output ripple voltage at full load.

Referring to FIG. 6, the performance of voltage regulator 16 is shown with the regulator supplying a full load. The voltage regulator 16 as shown in FIGS. 1 and 5 was used to generate the curves except the center tap of winding 156 of transformer 157 was coupled to the input of boost regulator 29, line 17, for the DC power source to chopper 28. In FIG. 6, the ordinate represents volts and the abscissa represents time. Curve A shows the ripple voltage on the input line such as line 17 of voltage regulator 16. Curve A has an average of 300 volts DC. Curve B shows the output voltage of boost regulator 29 such as on line 30 having an average voltage of 330 volts DC with a small amount of ripple voltage superimposed.

Figure 7:
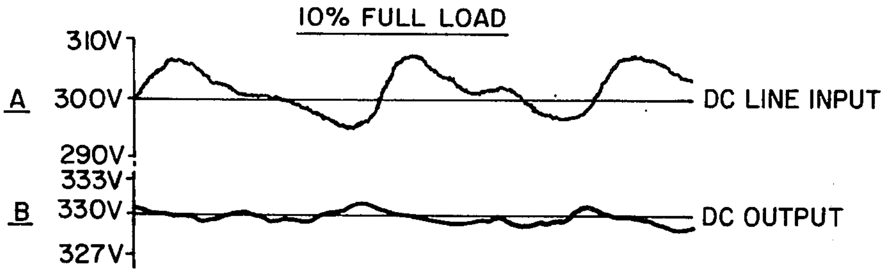
FIG. 7 shows curves for the input and output ripple voltage at 10% full load.

FIG. 7 shows the performance of voltage regulator 16 providing an output power of 10% of the full load. The voltage regulator 16 as shown in FIGS. 1 and 5 was used to generate the curves except the center tap of winding 156 of transformer 157 was coupled to the input of boost regulator 29, line 17, for the DC power source to chopper 28. Full load is determined by the maximum output power that the voltage regulator 16 is designed for at the regulated voltage. In FIG. 7 the ordinate represents volts and the abscissa represents time. Curve A represents the input voltage having an average voltage of 300 volts DC with some ripple voltage superimposed. Curve A represents the voltage which may appear at the input voltage regulator 16 on line 17. The output of boost regulator 29 such a line 30 is shown in curve B having an output voltage of 330 volts DC with a small amount of ripple voltage superimposed.

Figure 8:
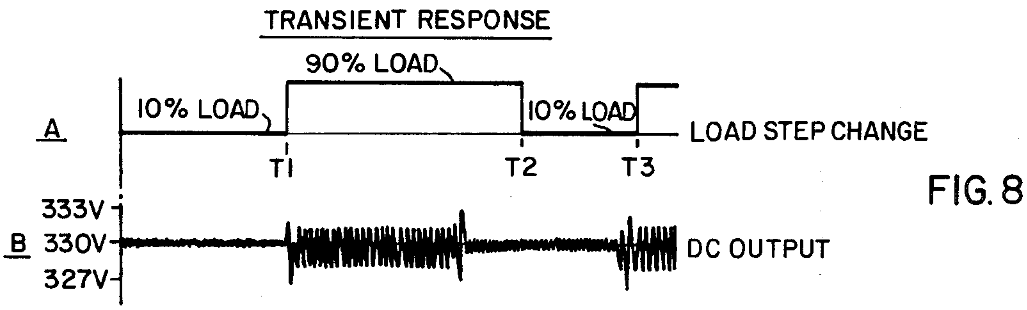
FIG. 8 shows a curve of the output voltage during transient loads or from 10% to 90% full load.

FIG. 8 shows a curve of the output voltage of voltage regulator 16 during transient load. The voltage regulator 16 as shown in FIGS. 1 and 5 was used to generate the curves except the center tap of winding 156 of transformer 157 was coupled to the input of boost regulator 29, line 17, for the DC power source to chopper 28. In FIG. 8, the load is varied from 10 to 90% full load at $T_1$ and from 90% full load to 10% full load at time $T_2$. At time $T_3$, the load is stepped from 10% full load to 90% full load. Curve A shows the variation in load from 10% to 90% while curve B shows the output voltage of boost regulator 29 such as on line 30. In FIG. 8, the ordinate represents the percent load for curve A and voltage for curve B and the abscissa represents time for both curves A and B. The input voltage such as on line 17 of boost regulator 29 is 300 volts and the output which is on line 30 is shown in curve B having an average voltage of 330 volts.

The invention provides a voltage regulator for providing a voltage from a power line comprising an input terminal coupled to the power line, an output terminal, a voltage source, a reference voltage, a plurality of boost regulators each having a first and second terminal and connected in series between the input and output terminals, means for comparing the reference voltage with the voltage on the output terminal to generate a plurality of control signals, at least one of said control signals coupled to each boost regulator, each boost regulator coupled to the voltage source, each boost regulator including first means coupled to the voltage source and to the first and second terminals for coupling the terminals for coupling the voltage source between the input terminal and the output terminal in response to the control signal coupled to the boost regulator, and second means coupled to the first and second terminals for coupling the first terminal to the second terminal at times when voltage of the second terminal is below a predetermined value with respect to the first terminal.

The invention further provides a boost regulator for injecting a voltage onto a power line comprising an input terminal coupled, to the power line, a control signal, a voltage source for providing a voltage in response to the control signal, an output terminal, first means coupled to the voltage source and to the input and output terminals for coupling the voltage between the input terminal and the output terminal, and second means coupled to the input and output terminals for coupling the input terminal to the output terminal at times when the voltage is below a predetermined value.

What we claim is:

1. A boost circuit for injecting a voltage from an external voltage source between an input and output terminal in response to a control signal and at other times coupling by means of a conductive path, said input terminal to said output terminal comprising:
   a first diode having an anode coupled to said input terminal and a cathode coupled to said output terminal;
   a transformer having a first winding with a center tap and a second winding with a center tap, said center tap of said second winding coupled to said input terminal;
   a second diode having an anode coupled to one end of said second winding;
   a third diode having an anode coupled to the other end of said second winding;
   said second and third diodes having a cathode coupled to said output terminal;
   a fourth diode having a cathode coupled to one end of said first winding;
   a fifth diode having a cathode coupled to the other end of said first winding;
   said fourth diode having an anode coupled to a first terminal of said external voltage source;
   said fifth diode having an anode coupled to a second terminal of said external voltage source;
   a transistor having an emitter, base, and collector;
   said emitter coupled to a return path of said external voltage source;
   said collector coupled to said center tap of said first winding; and
   said base coupled to said control signal.

2. A boost circuit for injecting a voltage from an external voltage source between an input and output terminal in response to a control signal and at other times coupling by means of a conductive path said input terminal to said output terminal comprising:
   a control means having a first, second, and third terminal, said first terminal coupled to said output terminal, said second terminal coupled to said control signal, the impedance across said first and third terminals responsive to said control signal;
   first means coupled to said voltage source, to said input terminal, and to said third terminal of said control means for coupling a voltage between said input terminal and said control means;
   second means coupled to said input and output terminals for providing a conductive path between said input terminal and output terminals at times when said voltage is below a predetermined value.

3. The boost circuit of claim 2 wherein said first means includes a transformer having a first and second winding, said first winding including a center tap coupled to said input terminal.

4. The boost circuit of claim 2 wherein said control means includes a transistor.

5. The boost circuit of claim 2 wherein said second means includes a diode.

6. A boost circuit for injecting a voltage from an external voltage source between an input and output terminal in response to a control signal and at other times coupling by means of a conductive path said input terminal to said output terminal comprising:
   a first diode having an anode coupled to said input terminal and a cathode coupled to said output terminal;
   a transformer having a first winding and a second winding with a center tap, said center tap coupled to said input terminal;
   a second diode having an anode coupled to one end of said second winding;
   a third diode having an anode coupled to the other end of said second winding;
   a transistor having an emitter, base, and collector, said emitter coupled fto said output terminal, said collector coupled to the cathodes of said second and third diodes, said base coupled to said control signal; and said first winding of said transformer coupled to said external voltage source.

7. A voltage regulator for providing a predetermined voltage from a power line comprising:
   an input terminal coupled to said power line;
   an output terminal;
   means for a voltage source;
   means for a reference voltage;
   a plurality of boost regulators each having a first and second terminal and connected in series between said input and output terminals;
   means for comparing said reference voltage with the voltage on said output terminal to generate a plurality of control signals;
   at least one of said control signals coupled to each boost regulator;
   each boost regulator including:
   first means coupled to said means for a voltage source and to said first and second terminals for coupling a voltage source between said first and second terminals in response to one of said control signals coupled to said boost regulator, said first means including a transformer having a first and second winding, said first winding including a center tap coupled to said first terminal; and second means coupled to said first and second terminals for coupling said first terminal to said second terminal at times when said voltage of said second terminal is below a predetermined value with respect to said first terminal.

8. The voltage regulator of claim 7 wherein said means for a voltage source includes a DC/DC converter chopper.

9. The voltage regulator of claim 8 wherein said DC/DC converter chopper includes a transformer having a first winding to supply a voltage.

10. The voltage regulator of claim 9 wherein said DC/DC converter chopper includes a second winding on said transformer to supply a regulated voltage to a load.

11. The voltage regulator of claim 10 wherein said DC/DC converter chopper includes means for locking the frequency of said voltage of said means for a voltage source to an external signal.

12. A voltage regulator for providing a predetermined voltage from a power line comprising:

an input terminal coupled to said power line;

an output terminal;

means for a voltage source, said voltage source includes a DC/DC converter;

means for a reference voltage;

a plurality of boost regulators each having a first and second terminal and connected in series between said input and output terminals;

means for comparing said reference voltage with a voltage derived from said DC/DC converter to generate a plurality of control signals;

at least one of said control signals coupled to each boost regulator;

each boost regulator including:

first means coupled to said means for a voltage source and to said first and second terminals for coupling a voltage between said first and second terminals in response to one of said control signals coupled to said boost regulator; and second means coupled to said first and second terminals for coupling said first terminal to said second terminal at times when said voltage of said second terminal is below a predetermined value with respect to said first terminal.

* * * * *